(12) United States Patent
Kikuchi et al.

(10) Patent No.: US 8,252,395 B2
(45) Date of Patent: Aug. 28, 2012

(54) INJECTION-MOLDED BODY

(75) Inventors: Shinji Kikuchi, Miyagi-Ken (JP); Hideki Abe, Miyagi-Ken (JP); Junichi Hosogoe, Miyagi-Ken (JP); Tsuguhisa Hayashida, Miyagi-Ken (JP); Hitoshi Homma, Miyagi-Ken (JP)

(73) Assignee: Alps Electric Co., Ltd., Tokyo (JP)

( * ) Notice: Subject to any disclaimer, the term of this patent is extended or adjusted under 35 U.S.C. 154(b) by 29 days.

(21) Appl. No.: 13/034,632

(22) Filed: Feb. 24, 2011

(65) Prior Publication Data

US 2011/0229666 A1 Sep. 22, 2011

(30) Foreign Application Priority Data

Mar. 16, 2010 (JP) ................. 2010-059341

(51) Int. Cl.
*B29D 22/00* (2006.01)
(52) U.S. Cl. .................. 428/34.1; 277/637; 15/250.23; 15/250.14; 15/250.34; 74/25
(58) Field of Classification Search .................. 428/34.1; 74/25; 296/84.1; 200/252, 179; 15/256.3, 15/250.31, 250.34, 250.23, 250.14, 250.27; 277/637

See application file for complete search history.

(56) References Cited

U.S. PATENT DOCUMENTS

| 8,136,279 | B1* | 3/2012 | Nearman et al. ............. 40/564 |
| 2011/0219564 | A1* | 9/2011 | Kikuchi et al. ............. 15/256.5 |
| 2011/0229666 | A1* | 9/2011 | Kikuchi et al. ............. 428/34.1 |

FOREIGN PATENT DOCUMENTS

JP 2001-300971 10/2001

* cited by examiner

*Primary Examiner* — N. Edwards
(74) *Attorney, Agent, or Firm* — Bayer Law Group LLP (57) ABSTRACT

An injection-molded body according to the present invention includes a tubular body portion, an airtight seal surface formed on a peripheral surface of the body portion near one end of the body portion, and a plurality of undercuts disposed at positions around the peripheral surface of the body portion that are closer to the end than the airtight seal surface is. The undercuts prevent a seal member mounted on the airtight seal surface from falling off, in which a clearance is formed between a peripheral wall and the undercuts. The peripheral wall defines an inner hole of the body portion, and the clearance accommodates deformation of the undercuts in radial directions.

4 Claims, 7 Drawing Sheets

INJECTION-MOLDED BODY

CLAIM OF PRIORITY

This application claims benefit of Japanese Patent Application No. 2010-059341 filed on Mar. 16, 2010, which is hereby incorporated by reference.

BACKGROUND OF THE INVENTION

1. Field of the Invention

The present invention relates to an injection-molded body provided with undercuts.

2. Description of the Related Art

Presently, injection-molded bodies of a variety of shapes are formed for a variety of applications by a variety of injection molding methods. In the auto industry and other fields of industries, a variety of parts are formed by injection molding. For example, there is a variable resistor used in a rotation angle detecting sensor (hereinafter, referred to as the "valve sensor" where appropriate) of a swirl control valve used to generate a longitudinal or transverse vortex of air by being opened or closed when a mixture of gasoline and air is fed into a cylinder on an air intake side of an engine. In such a variable resistor, a housing including a rotor of the variable resistor is formed by injection molding.

Since the above-described housing of the valve sensor as the injection-molded body is assembled into a portion in which air intake is controlled, the housing needs a sufficient airtightness. For this reason, seal members such as O-rings are provided where necessary, and so-called undercuts for preventing those seal members from falling off are provided in the housing. Presently, undercuts of such injection-molded bodies are formed by using parts such as slide cores or in processes such as forced demolding (for example, see Japanese Unexamined Patent Application Publication No. 2001-300971).

SUMMARY OF THE INVENTION

Since parting lines are formed around surfaces where slide cores meet in molding methods using slide cores in forming undercuts, such methods cannot be used to form the above-described housing of the valve sensor that needs a certain degree of surface smoothness and an external shape suitable for a sliding surface and an airtight seal surface. In contrast, the above-described forced demolding using a vertically openable mold does not cause such a problem and, accordingly, can be used to form the housing of the valve sensor. However, when forming of undercuts having necessary strength is attempted using generally used forced demolding, there is the possibility of causing damage to the undercuts due to stress applied to the molded undercuts when a molded part is removed from the mold. There also is a problem in that the life of the mold is decreased because of a large frictional force due to such stress generated between the molded part and the mold when the molded part is removed from the mold.

The present invention is proposed in view of the situation above. The present invention provides an injection-molded body for which damage to the undercuts can be prevented by reducing stress that occurs when a molded part is removed from the mold in forced demolding, and the life of the mold used to form such an injection-molded body can be extended.

An injection-molded body according to the present invention includes a tubular body portion, an airtight seal surface formed on a peripheral surface of the body portion near one end of the body portion, and a plurality of undercuts disposed at positions around the peripheral surface of the body portion that are closer to the end than the airtight seal surface is. The undercuts prevent a seal member mounted on the airtight seal surface from falling off, in which a clearance is formed between a peripheral wall and the undercuts. The peripheral wall defines an inner hole of the body portion, and the clearance accommodates deformation of the undercuts in radial directions.

The above-described injection-molded body has the clearance, which accommodates deformation of the undercuts in the radial directions, between the undercuts and the peripheral wall that defines the inner hole of the body portion. With the clearance, the undercuts can deform in the radial directions during removal from the mold even when the molded body is formed by forced demolding (injection molding). Thus, stress applied to the undercuts during removal from the mold is reduced, and damage to the undercuts caused during removal from the mold can be prevented. In addition, since forced demolding can be performed with such small stress, the wear on the mold can be decreased (accordingly, variation in the dimensions of molded parts and maintenance work on the mold can be decreased). This can assist in extending the life of the mold. Since the structure of the mold can also be simplified due to such decreased stress, the mold can be manufactured at a lower cost. Furthermore, in forced demolding, it is taken into account that the undercuts deform during removal from the mold. Thus, the undercuts can be formed of a hard molding material depending on the shape of the undercuts.

In the above-described injection-molded body, the inner hole is preferably formed as an insertion hole into which a rotating shaft for rotating the body portion is inserted, and the clearance is preferably formed along an entire periphery of the peripheral wall. In this case, since the clearance is formed along the entire periphery of the peripheral wall, the shaft insertion hole of the rotating shaft that needs a precision in shape and dimensions can be completely separated from the undercuts. Thus, deformation due to forced demolding does not affect the shaft insertion hole that needs a precision in shape and dimensions (dimensional changes due to forced demolding is not transferred to the shaft insertion hole).

Also, the above-described injection-molded body preferably has a cutout formed between the undercuts. In this case, since the cutout is formed between the undercuts, continuity in the shape of the undercuts in a circumferential direction is interrupted. Thus, the undercuts can easily deform. For this reason, the molded body easily bends and is easily removed from the mold in forced demolding. By doing this, stress that occurs in forced demolding can be further reduced, and damage to the undercuts can be reliably prevented.

Also in the above-described injection-molded body, the cutout preferably has a depth substantially corresponding to a dimension of an area where the undercuts are formed. In this case, the undercuts can sufficiently deform during removal from the mold due to the cutout, which has an appropriate depth. Thus, stress applied to the undercuts can be sufficiently relieved.

DESCRIPTION OF THE PREFERRED EMBODIMENTS

An embodiment of the present invention will be described below in detail with reference to the accompanying drawings. In the description below, a variable resistor according to the present embodiment is used in a rotation angle detecting sensor of a swirl control valve, which is used to generate a longitudinal or transverse vortex of air by being opened or closed when a mixture of gasoline and air is fed into a cylinder on an air intake side of an engine. However, the application of the variable resistor according to the present embodiment is not limited to this example. An item to which the present embodiment is applied can be changed.

Figure 1:
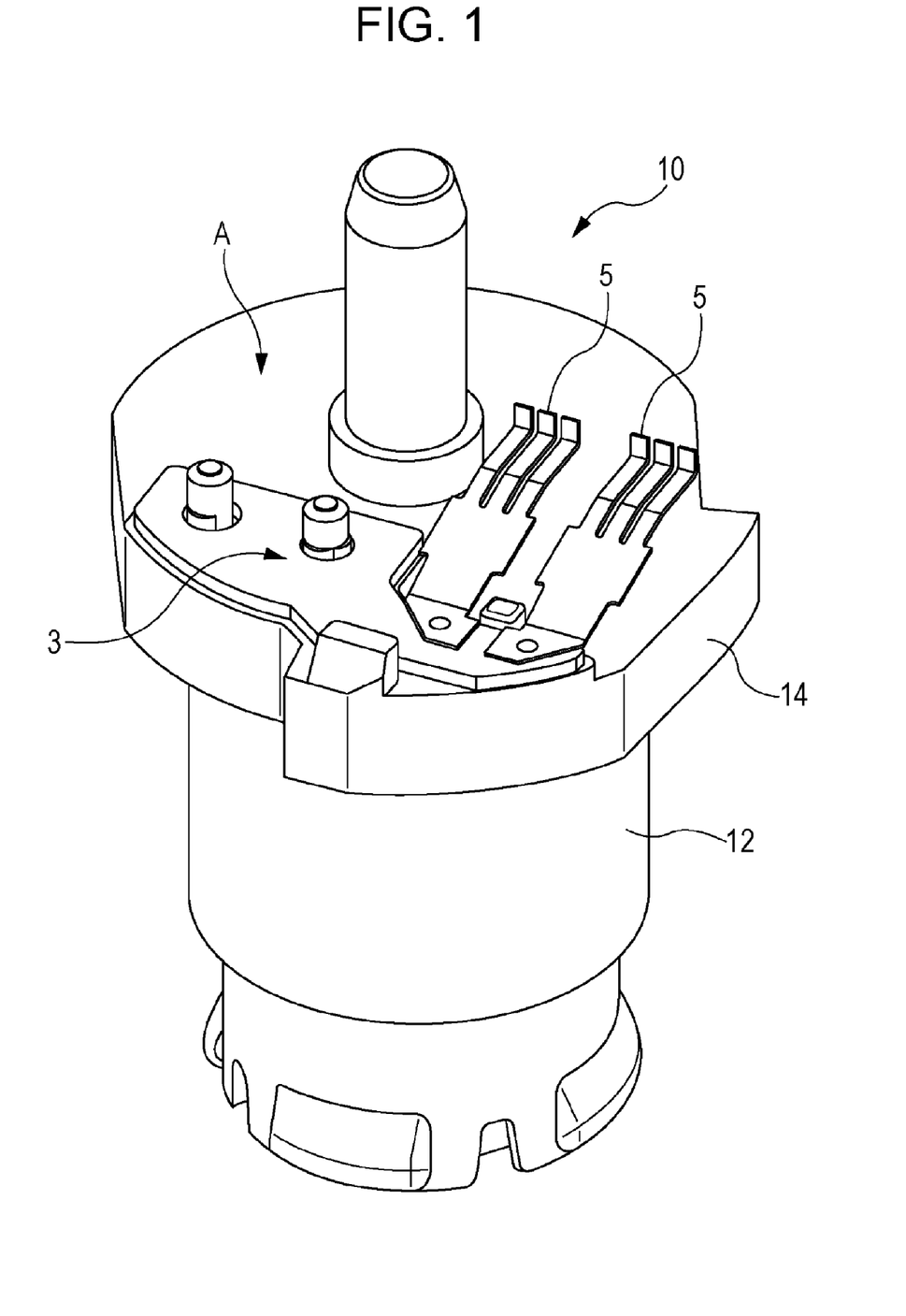
FIG. 1 is a perspective view illustrating a wiper area of a rotor, which is an injection-molded body, of a variable resistor according to an embodiment of the present invention.
Figure 2:
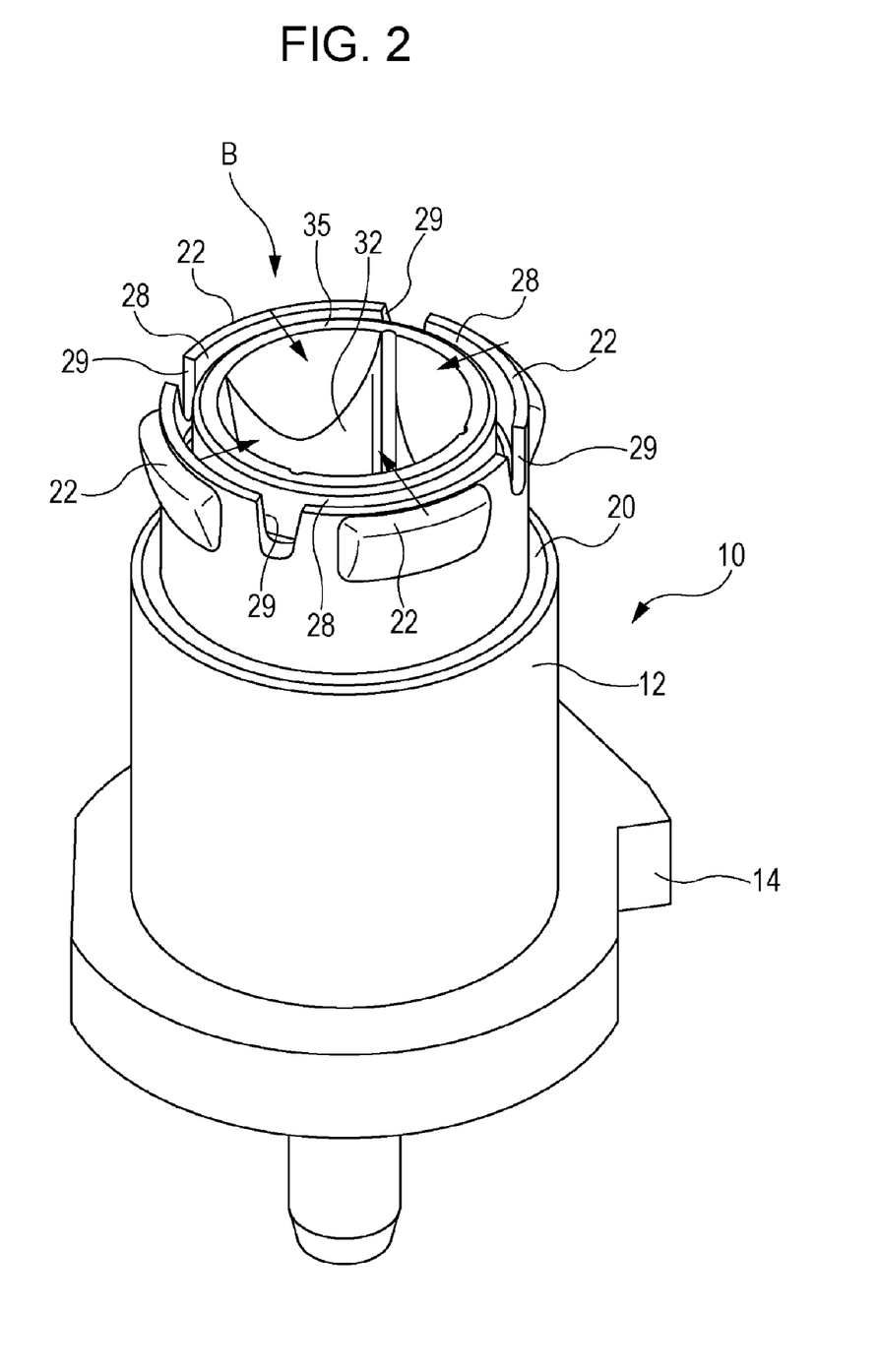
FIG. 2 is a perspective view illustrating a shaft insertion area of the rotor of the variable resistor according to the embodiment.

FIG. 1 is a perspective view illustrating a wiper area A of a rotor 10 of the variable resistor according to the embodiment of the present invention. FIG. 2 is a perspective view illustrating a shaft insertion area B of the rotor 10 of the variable resistor according to the present embodiment. As illustrated in FIGS. 1 and 2, the variable resistor according to the present embodiment includes the wiper area A at one end of the rotor 10 and the shaft insertion area B at the other end thereof opposite the wiper area A.

The variable resistor according to the present embodiment includes a substrate (not shown) that includes a resistor pattern formed thereon and an electrically insulative wiper support 14 that is assembled into the variable resistor as illustrated in FIG. 1. The wiper support 14 fixedly holds a wiper 3 provided with metal wiper fingers 5 that resiliently contact the above resistor pattern. The wiper support 14 is disposed at an end of a tubular body portion 12 of the rotor 10 that rotates.

In the variable resistor according to the present embodiment, the rotor 10 is formed by injection molding. In addition, since the rotor 10 is assembled into a portion in which air intake is controlled, the rotor 10 as an injection-molded body needs a sufficient airtightness. For this purpose, as illustrated in FIG. 2, an airtight seal surface 20 is formed on a peripheral surface near one end (end on the shaft insertion area B side) of the body portion 12 of the rotor 10. In addition, a plurality of (four with equal angular intervals in a circumferential direction in the present embodiment) undercuts 22 are disposed at positions around the peripheral surface that are closer to the end (upper end illustrated in FIG. 2) than the airtight seal surface 20 is. The undercuts 22 are formed in order to prevent a seal member such as an O-ring mounted on the airtight seal surface 20 from falling off. Since the airtight seal surface 20 needs to be flat, the undercuts 22 are formed by forced demolding using a vertically openable mold.

Figure 3:
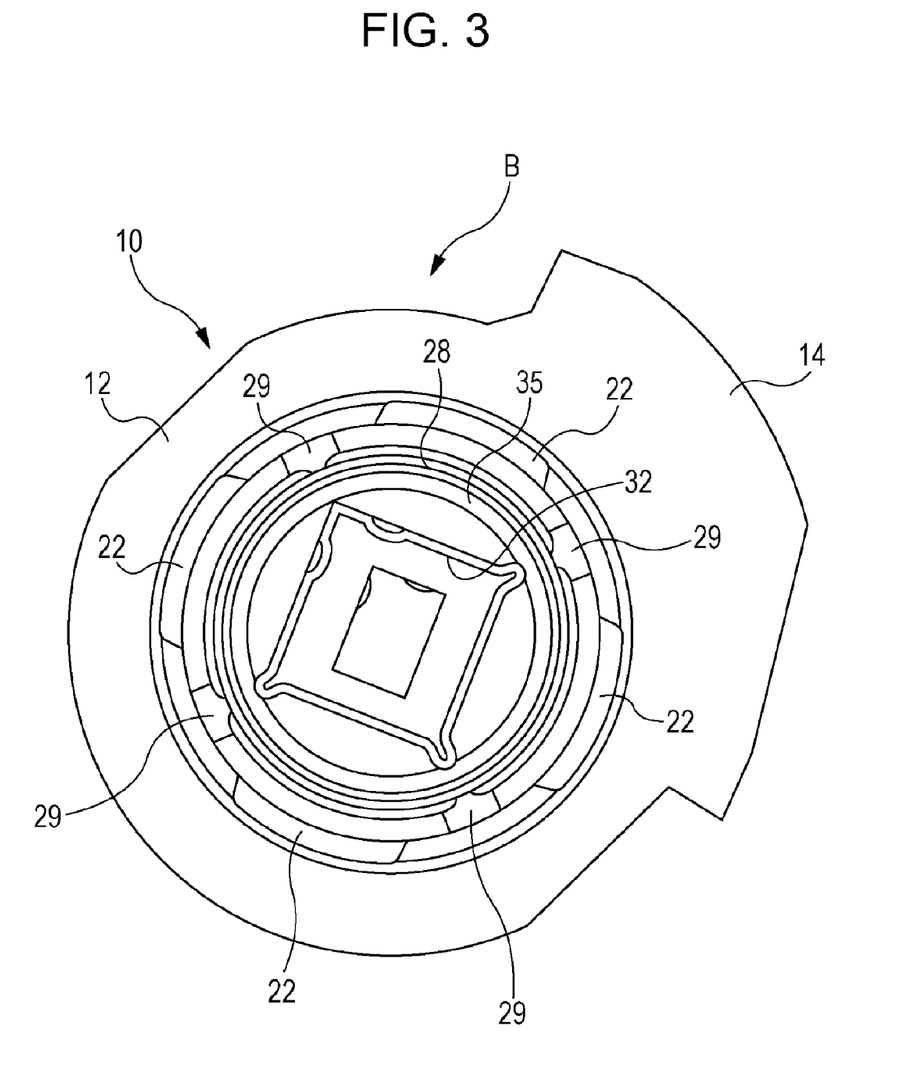
FIG. 3 is a plan view of the shaft insertion area of the rotor of the variable resistor according to the embodiment.

FIG. 3 is a plan view of the shaft insertion area B of the rotor 10 of the variable resistor according to the present embodiment. As illustrated in FIG. 3, in the rotor 10, a shaft insertion hole 32 is formed in the shaft insertion area B. A rotating shaft 30 (see FIGS. 6 and 7) for rotating the rotor 10 is inserted into the shaft insertion hole 32.

A peripheral wall 35 disposed in the rotor 10 defines the inner hole of the body portion 12. The inner hole may be formed as the shaft insertion hole 32. A clearance 28, which accommodates deformation of the undercuts 22 in radial directions, is formed in an area between the peripheral wall 35 and the undercuts 22 formed on the body portion 12. The clearance 28 may be formed along the entire peripheral of the peripheral wall 35. The clearance 28 is formed in order to reduce stress that is applied to the rotor 10 when the rotor 10 as the injection-molded body is removed from the mold in forced demolding.

Figure 4:
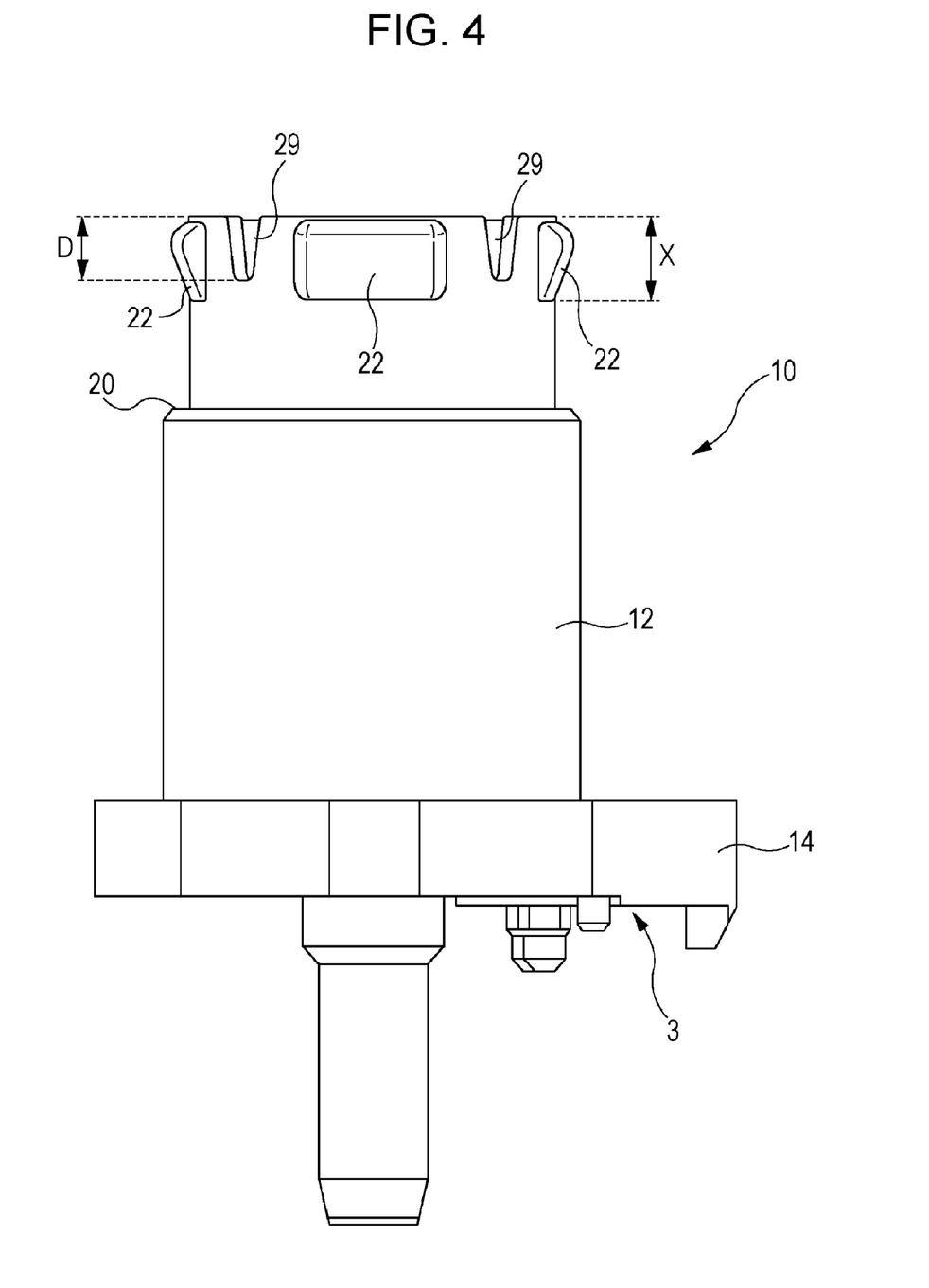
FIG. 4 is a side view of the rotor of the variable resistor according to the embodiment.

FIG. 4 is a side view of the rotor 10 of the variable resistor according to the present embodiment. As illustrated in FIGS. 3 and 4, the rotor 10 may have cutouts 29. Each of the cutouts 29 is formed between the undercuts 22 in the peripheral wall at the end of the body portion 12 where the undercuts 22 are disposed. In this case, the cutouts 29 are formed in the peripheral wall at the end of the body portion 12 with equal intervals. The depth D of each cutout 29 may be set to a dimension substantially corresponding to the dimension of an area X where the undercuts 22 are formed (see FIG. 4). The cutouts 29 are provided in a manner as described above in order to reduce stress that occurs in the undercuts 22 due to forced demolding.

Figure 5:
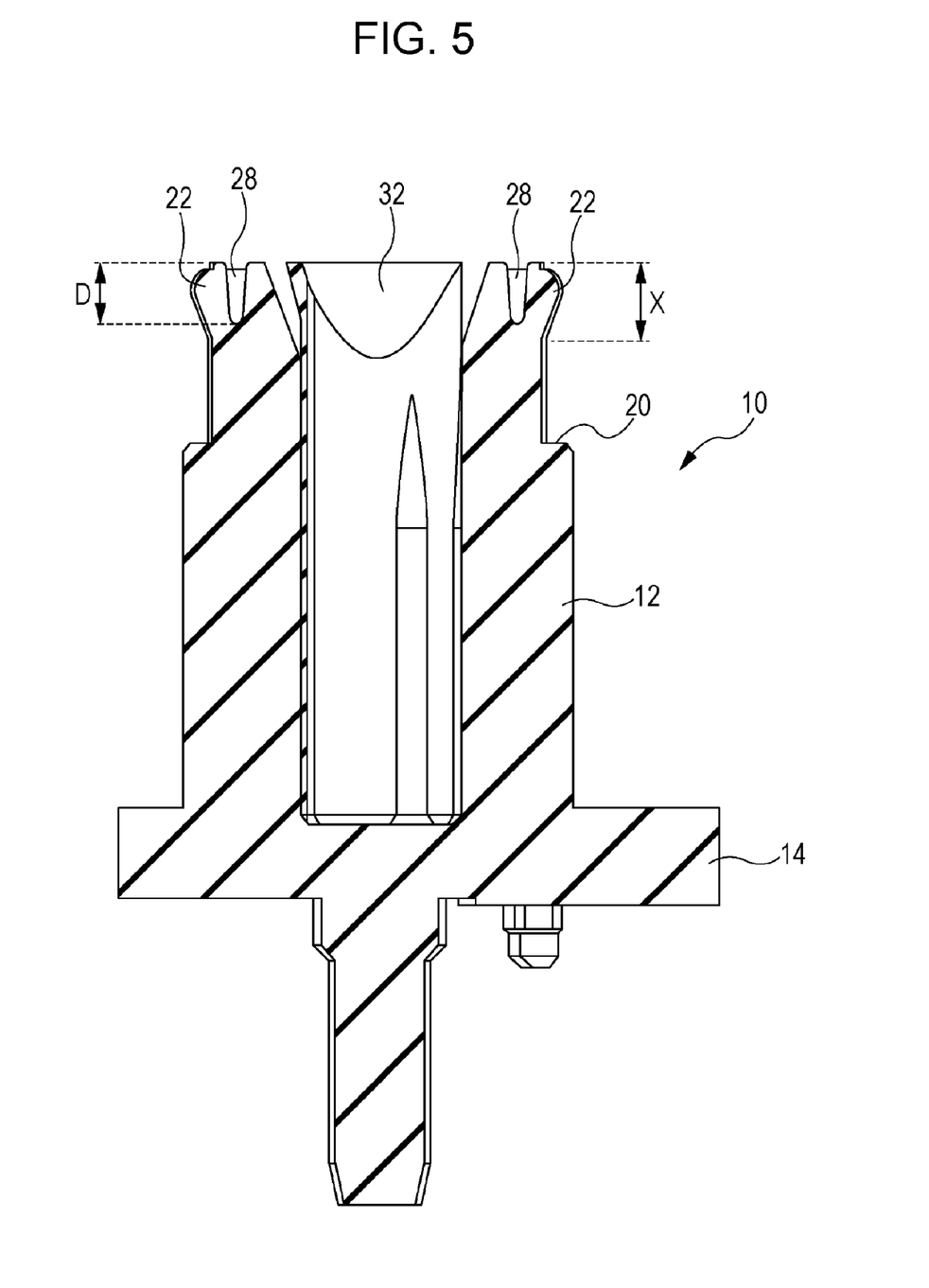
FIG. 5 is a side sectional view of the rotor of the variable resistor according to the embodiment.

The clearance 28 between the above-described undercuts 22 and the peripheral wall 35 is formed, as illustrated in FIG. 5, in a certain range from one end of the body portion 12 (end on the shaft insertion area B side) of the rotor 10. It is preferable as the embodiment that the range in which the clearance 28 is provided be made to match the depth D of the cutout 29. In such a case, stress that occurs in the undercuts 22 can also be reduced in addition to the effect of stress reduction due to the cutouts 29.

Figure 6:
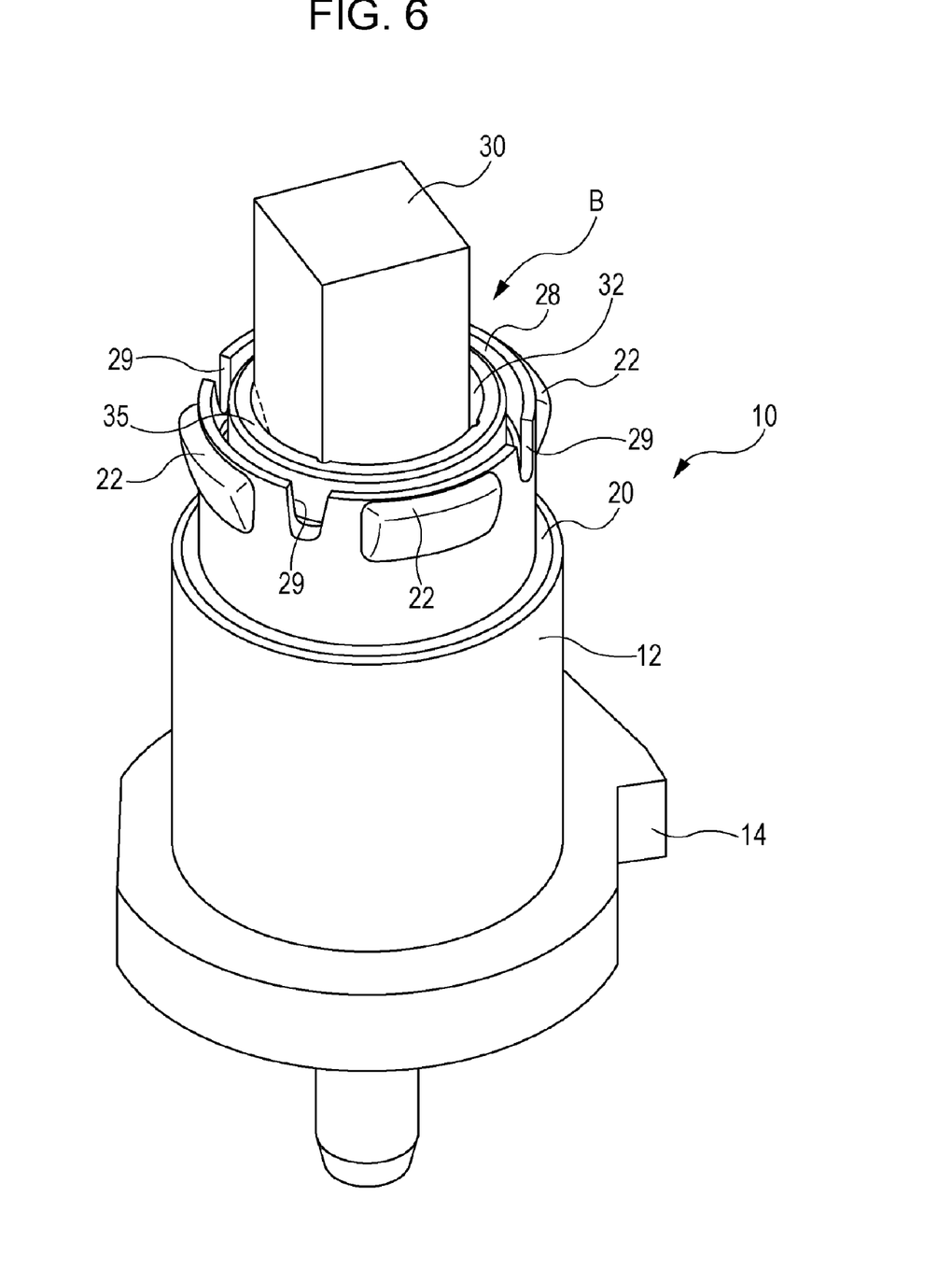
FIG. 6 is a perspective view illustrating a state in which a rotating shaft has been inserted into a shaft insertion hole in the shaft insertion area of the rotor of the variable resistor according to the embodiment.
Figure 7:
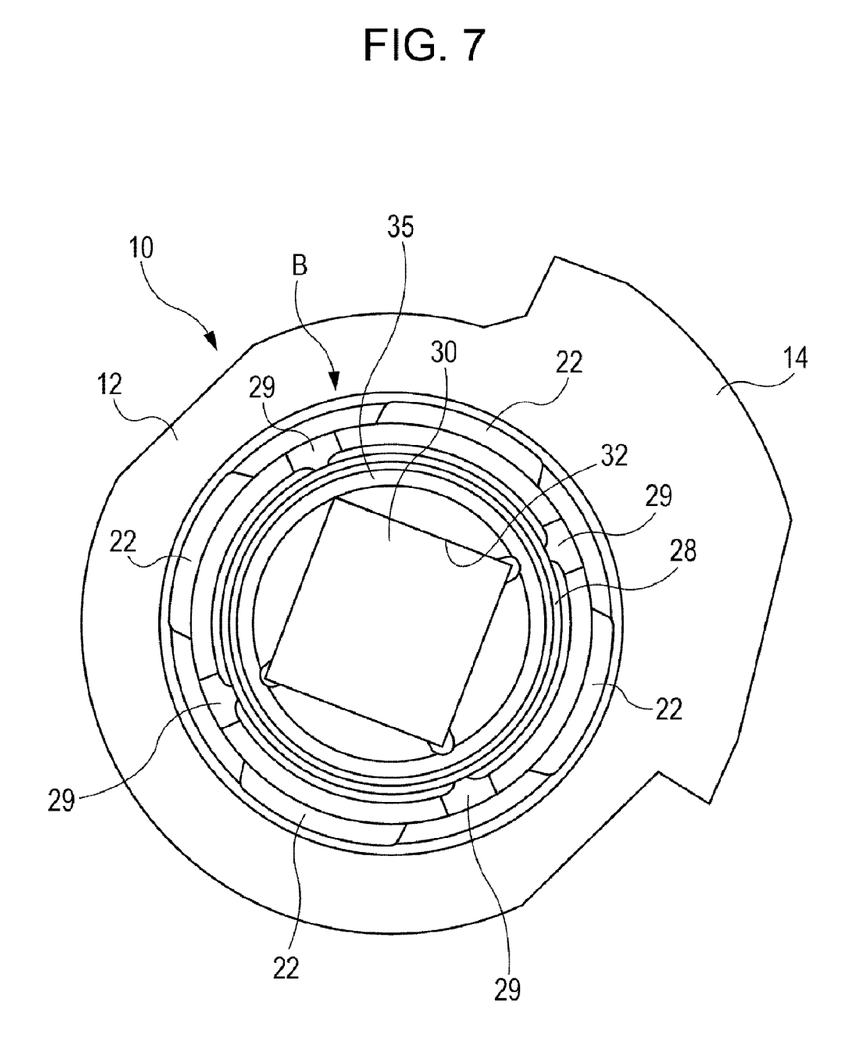
FIG. 7 is a plan view of the rotor of the variable resistor in the state illustrated in FIG. 6.

Next, a state will be described, in which the rotating shaft 30 is inserted into the shaft insertion hole 32 of the rotor 10 of the variable resistor according to the present embodiment. FIGS. 6 and 7 are respectively a perspective view and a plan view of the state in which the rotating shaft 30 has been inserted into the shaft insertion hole 32 of the rotor 10 of the variable resistor according to the present embodiment.

As illustrated in FIGS. 6 and 7, the rotating shaft 30 is inserted into the shaft insertion hole 32 formed in the rotor 10. In this case, the rotating shaft 30 is secured to the rotor 10 in tight contact with the inner wall surface of the peripheral wall 35. The rotor 10 is rotatable in an integrated manner with the rotating shaft 30 as the rotating shaft 30 having been inserted into and secured to the rotor 10 rotates. The shaft insertion hole 32 needs a certain precision in shape and dimensions in order to perform its function of appropriately transferring the rotation of the rotating shaft 30 to the rotor 10. In a rotation angle detecting sensor including the rotor 10 that is structured as above, when the wiper 3 (wiper fingers 5) provided in the rotor 10 slides along the resistor pattern due to rotation of the rotating shaft 30, the resistance changes. A rotation angle can be detected by an electrical signal related to the change in resistance.

The rotor 10 structured as above as the injection-molded body according to the present embodiment has the clearance 28, which accommodates deformation of the undercuts 22 in the radial directions, between the undercuts 22 and the peripheral wall 35 that defines the inner hole (the shaft insertion hole 32) of the body portion 12. With the clearance 28, the undercuts 22 can deform in the radial directions (directions indicated by the arrows in FIG. 2) during removal from the mold even when the molded body is formed by forced demolding (injection molding) in which a vertically openable mold is used in order to prevent the formation of a mold parting line of the mold on the airtight seal surface 20. Thus, stress applied to the undercuts 22 during removal from the mold can be reduced, and damage to the undercuts 22 caused during removal from the mold can be prevented. In addition, since forced demolding can be performed with such small stress, the wear on the mold can be decreased (accordingly, variation in the dimensions of molded parts and maintenance work on the mold can be decreased). This can assist in extending the life of the mold. Since the structure of the mold can also be simplified due to such decreased stress, the mold can be manufactured at a lower cost. Furthermore, in forced demolding, it is taken into account that the undercuts 22 deform when they are removed from the mold. Thus, the undercuts 22 can be formed of a hard molding material depending on the shape of the undercuts 22.

In the rotor 10 according to the present embodiment, the clearance 28 may be formed along the entire periphery of the peripheral wall 35. In this case, the shaft insertion hole 32 of the rotating shaft 30 that needs a precision in shape and dimensions can be completely separated from the undercuts 22. Thus, a structure can be achieved, in which deformation due to forced demolding does not affect the shaft insertion hole 32 that needs a precision in shape and dimensions. In other words, such a structure can prevent dimensional changes due to forced demolding from being transferred to the shaft insertion hole 32.

Furthermore, in the rotor 10 according to the present embodiment, the cutouts 29 may be provided between the undercuts 22. This interrupts continuity in the shape of the undercuts 22 in a circumferential direction. Thus, the undercuts 22 can easily deform. For this reason, the rotor 10 easily bends and is easily removed from the mold in forced demolding. By doing this, stress that occurs in forced demolding can be further reduced and damage to the undercuts 22 can be reliably prevented.

In addition, in the rotor 10 according to the present embodiment, the depth D of each cutout 29 may be set to a dimension substantially corresponding to the dimension of the area X of the undercuts 22. In this case, the undercuts 22 can suffi-ciently deform during removal from the mold. Thus, stress applied to the undercuts 22 can be sufficiently relieved. In addition, since the O-ring does not contact the cutout 29 portion, airtightness can be achieved.

It is noted that the present invention is not limited to the above-described embodiment but can be implemented with a variety of modifications. In the above-described embodiment, sizes, shapes, and so forth are not limited to those illustrated in the accompanying drawings and can be changed according to need as long as advantages of the present invention is achievable. In addition, modifications according to need can be implemented without departing from the scope of the present invention.

What is claimed is:

1. An injection-molded body, comprising:
a tubular body portion;
an airtight seal surface formed on a peripheral surface of the body portion near one end of the body portion; and
a plurality of undercuts disposed at positions around the peripheral surface of the body portion, the positions being closer to the end than the airtight seal surface is, the undercuts preventing a seal member mounted on the airtight seal surface from falling off,
wherein a clearance is formed between a peripheral wall and the undercuts, the peripheral wall defining an inner hole of the body portion, the clearance accommodating deformation of the undercuts in radial directions.

2. The injection-molded body according to claim 1, wherein the inner hole is formed as an insertion hole, a rotating shaft for rotating the body portion being inserted into the insertion hole, and
wherein the clearance is formed along an entire periphery of the peripheral wall.

3. The injection-molded body according to claim 1, wherein a cutout is formed between the undercuts.

4. The injection-molded body according to claim 3, wherein the cutout has a depth substantially corresponding to a dimension of an area for formation of the undercuts.

* * * * *